(12) United States Patent
Ishihara

(10) Patent No.: US 6,172,850 B1
(45) Date of Patent: *Jan. 9, 2001

(54) FLOATING TYPE MAGNETIC HEAD WITH NON-MAGNETIC THIN FILM COATING PATTERN TO REDUCE STARTING FRICTION

(75) Inventor: Hirohisa Ishihara, Niigata-ken (JP)

(73) Assignee: Alps Electric Co., Ltd. (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/857,379

(22) Filed: May 16, 1997

Related U.S. Application Data

(63) Continuation of application No. 08/529,779, filed on Sep. 18, 1995, now abandoned.

(30) Foreign Application Priority Data

Sep. 29, 1994 (JP) .................................... 6-259378

(51) Int. Cl.$^7$ .................................................. G11B 21/20
(52) U.S. Cl. ........................................................ 360/235.2
(58) Field of Search ............................... 360/103, 235.5, 360/235.8, 237.1, 235.2

(56) References Cited

U.S. PATENT DOCUMENTS

| | | | |
|---|---|---|---|
| 5,010,429 | 4/1991 | Taguchi et al. | 360/103 |
| 5,079,657 | 1/1992 | Aronoff et al. | 360/103 |
| 5,159,508 | 10/1992 | Grill et al. | 360/103 |
| 5,162,073 | 11/1992 | Aronoff et al. | 156/625 |

FOREIGN PATENT DOCUMENTS

| | | | |
|---|---|---|---|
| 51-71117 | * 6/1976 | (JP) . | |
| 58-114328 | * 7/1983 | (JP) | 360/103 |
| 63-37874 | * 2/1988 | (JP) . | |
| 3-232168 | * 10/1991 | (JP) | 360/103 |
| 4-281209 | * 10/1992 | (JP) . | |
| 4-324175 | * 11/1992 | (JP) . | |
| 5-54582 | * 3/1993 | (JP) . | |
| 5-89626 | * 4/1993 | (JP) . | |
| 6-52533 | * 2/1994 | (JP) | 360/103 |
| 6-290563 | * 10/1994 | (JP) | 360/103 |

OTHER PUBLICATIONS

Rose, Arthur and Elizabeth, "The Condensed Chemical Dictionary", 1961, pp 1019–1020.*

"Webster's II: New Riverside Dictionary", 1988, p 1084.*

* cited by examiner

Primary Examiner—David Davis
(74) Attorney, Agent, or Firm—Brinks Hofer Gilsin & Lione

(57) ABSTRACT

Thin protective films for protecting a thin films device are formed on ABS (air bearing surfaces) of a slider, and thin films made of the same material as that of the protective films are formed on the surfaces of the protective films. The thickness δ of each of the thin films can be 10 nm or more, and the ratio of the area of the thin films with respect to the air bearing surfaces can be, for example, 80% or less.

16 Claims, 5 Drawing Sheets

FLOATING TYPE MAGNETIC HEAD WITH NON-MAGNETIC THIN FILM COATING PATTERN TO REDUCE STARTING FRICTION

This application is a continuation of application Ser. No. 08/529,779, filed Sep. 18, 1995.

BACKGROUND OF THE INVENTION

1. Field of the Invention

The present invention relates to a floating type magnetic head having a slider that initially contacts a recording medium and then floats above the recording medium when the operation of a recording medium is started and more particularly, to a floating type magnetic head that is capable of reducing static friction force between a slider and the recording medium such that the force required to start the operation of the recording medium is also reduced.

2. Description of the Prior Art

FIG. 8 is a perspective view showing a floating type magnetic head for use in, for example, a hard disk apparatus in such a manner that the surface of the floating type magnetic head confronting the disk faces upwards.

The floating type magnetic head H, as shown in FIG. 8, has the top surface that is caused to face the recording surface of a hard disk which is a magnetic recording medium.

The floating type magnetic head H has a portion located upstream (portion a) with respect to direction x, in which the disk is moved, the portion being called a leading portion, and a portion located downstream (portion b) that is called a trailing portion. The slider 1 is made of a ceramic material or the like, and has an end surface 2 in the trailing portion b, to which a thin-film device 3 is attached. The thin-film device 3 comprises: a magnetic detection portion (an MR device portion) that uses magnetoresistive effect to reproduce a magnetic signal recorded on the disk; and a recording portion (an inductive device portion) having a pattern-formed coil or the like.

The slider 1 has, on its surface that faces the disk, rail portions 4 on the two sides of an air groove 7 thereof. The surfaces of the rail portions 4 are formed into air bearing surfaces (ABS) 5, that are in contact with the disk when the disk is stationary (that is, not rotated). An inclined surface 6 is formed at a leading end of each the air bearing surfaces 5.

The slider 1 of the magnetic head H is supported by a flexure secured to the leading end of a load beam, the slider 1 being urged against the disk with weak force of about 4 g (gram) by the elastic force of the load beam formed by a leaf spring. The magnetic head H is employed in a so-called CSS (Contact-Start-Stop) type hard disk apparatus in such a manner that the air bearing surfaces 5 of the slider 1 are brought into contact with the recording surface of the disk due to the forgoing urging force when the operation (rotation) of the disk is stopped. When the operation of the disk has been started, an air flow is, in the direction (in the direction X), in which the disk is moved, introduced between the slider 1 and the surface of the disk so that the slider 1 is caused to float above the surface of the disk by a short distance. The amount of floating of the slider 1 from the disk is determined due to the depth of the air groove 7 and to the surface areas of the air bearing surfaces 5.

When the slider 1 is being caused to float, the slider 1 has an attitude such that the leading portion (a) is raised higher than the trailing portion (b). In the foregoing attitude of floating, magnetic signals recorded on the disk are read by the magnetic detection portion of the thin-film device 3 or magnetic signals are recorded on the disk by the magnetic recording portion.

A motor for operating the disk, that is provided for the CSS-type hard disk apparatus, must have a starting torque which is capable of causing the disk and the slider 1 to reliably start the sliding operation. If the torque required to start the sliding operation between the disk and the slider is enlarged, the hard disk apparatus must be provided with a large-size motor. Thus, there arise problems in that the size of the apparatus cannot be reduced and that the electric power consumption is enlarged excessively.

The torque required to start the operation of the disk depends upon the static frictional force between the air bearing surfaces 5 of the slider 1 and the surface of the disk. To reduce the starting torque required for the disk, the foregoing static frictional force must be reduced.

The static frictional force has been reduced by a method in which each of the air bearing surfaces 5 is formed into a curved shape (a crown shape) having a large curvature radius or a method in which fine concavities and convexities are formed on the surfaces of the air bearing surfaces 5. By forming each of the air bearing surfaces 5 into the crown shape or by forming the fine concavities and convexities on the surfaces of the same, the area of actual contact between the air bearing surfaces 5 and the disk can be reduced.

However, forming of each of the air bearing surfaces 5 into the crown shape having a predetermined curvature radius requires a very difficult polishing operation, whereby the manufacturing process becomes too complicated. What is worse, the crown shape having the predetermined curvature radius cannot stably be formed, and thus mass production encounters a critical problem. If the concavities and convexities are formed on the surfaces of the air bearing surfaces 5, the air bearing surfaces 5 scratch the surface of the disk at the time of starting the operation of the disk, whereby the surface of the disk can easily be damaged.

Accordingly, in recent years, it might be considered feasible to employ a method of reducing the area of actual contact with a disk D by forming, on the air bearing surfaces 5, projections 5a, each having a somewhat large area, by etching the air bearing surfaces 5, as shown in FIG. 9. However, the etching process has too complicated steps and, thus, the cost required to machine the slider 1 cannot be reduced. In addition, the etching process for making the height δ of the stepped portion of the projection 5a to be uniform encounters a difficulty and there arises a problem in that the height δ varies among manufactured products.

Although the foregoing crown shape, fine concavities and convexities and the projections formed by the etching process are able to reduce the area of contact with the disk, the static frictional force between the disk and the slider 1 is not determined by only the area of contact but it is considerably affected by the lubricant on the surface of the disk and by a water screen adhered to the surface of the disk.

Lubricant having a thickness of several nm (nanometers) is applied to the surface of the hard disk. If the relative humidity in the environment in which the hard disk is used is about 50%, a water drop having a thickness of several nm adheres to the surface of the disk. In a state where the operation of the disk is stopped, the lubricant and water screen are allowed to intervene between the disk and the slider 1, thus causing the slider 1 to be adsorbed onto the disk. As a result, there arises a problem in that the static frictional force for sliding the slider 1 and the disk with respect to each other is enlarged excessively.

Although the method, in which the air bearing surfaces 5 are formed into the crown shapes, is able to reduce the area of contact, intervention of a liquid film formed by the lubricant and the water screen cannot be prevented. Also in the case where the fine concavities and convexities are formed on the surfaces of the air bearing surfaces 5, the foregoing liquid film intervenes among the fine concavities and the disk. In either case, the static frictional force cannot satisfactorily be reduced.

The maximum thickness of the liquid film formed by the lubricant and the water screen is about 10 nm. Therefore, in the structure as shown in FIG. 9, in which the projection 5a having a somewhat large area is formed on each of the air bearing surfaces 5 by the etching process, liquid film A is, due to the surface tension, formed among the air bearing surfaces 5 and the surface of the disk if the height δ of the stepped portion of the projection 5a is lower than 10 nm. The adsorbing force of the liquid film A undesirably enlarges the static frictional force. With the method, in which the projection 5a is formed by the etching process, the height δ of the stepped portion cannot easily be adjusted. If the value of the height δ is enlarged, a long time takes place to complete the etching process and thus a manufacturing cost cannot be reduced.

The conventional floating type magnetic head is usually formed into a bulk type having a structure such that a core, around which a coil is wound, is attached to the end of the trailing portion. In recent years, a structure, in which a thin-film device 3 is, as shown in FIG. 8, disposed on to the end surface 2 of the trailing portion, has been widely used. The structure comprising the thin-film device 3 as described above must have a protective film formed in a portion 8 in which the thin-film device 3 is exposed to the air bearing surface 5. In particular, a structure of a type, that the thin-film device 3 is provided with the magnetic detection portion (the MR device portion) that uses the magnetoresistive effect, encounters leakage of the electric current flowing in the device portion because a detection electric current is supplied to the device portion if the protective film, that is capable of electrically insulating the electric current, is not provided. Thus, there arises a problem in that the magnetic detection cannot be performed.

Since the size of the slider 1 of the foregoing type is too small to form the protective film in only the exposed portion 8, the protective film is usually formed on the entire surfaces of the air bearing surfaces 5 as well as the exposed portion 8. If the fine concavities and convexities are, as described above, formed on the air bearing surfaces 5 in the foregoing case so as to reduce the area of contact, the protective film is introduced into the fine concavities. Thus, the effect of reducing the static frictional force by forming the fine concavities and convexities cannot be attained satisfactorily.

In the case where the projection 5a having a somewhat large area is formed as shown in FIG. 9, the protective film is formed after the projection 5a has been formed by etching. If the protective film having a predetermined thickness is formed on the surfaces of the projection 5a and the air bearing surfaces 5, making of the height δ of the stepped portion to be a value larger than a predetermined value encounters an aggravated difficulty.

SUMMARY OF THE INVENTION

The present invention is directed to overcome the foregoing problems and therefore an object of the present invention is to reduce the static friction coefficient between a slider and a recording medium by forming, on ABS (air bearing surfaces) of the slider, thin films that are capable of decreasing the area of contact with the recording medium while necessitating a relatively simple process.

Another object of the present invention is to prevent adsorption taking place due to a liquid film allowed to intervene between a slider and a recording medium so as to prevent undesirable enlargement of the static frictional force due to the foregoing adsorption.

Another object of the present invention is to prevent change in the height of the stepped portion between contact surfaces taking place due to protective films for protecting an exposed portion of a thin-film device in a case where the protective films are formed, and to enable the protective films and projection to be formed by a continuous process.

According to the present invention, there is provided a floating type magnetic head comprising: a slider, the attitude of which is, at the time of starting the operation of a recording medium, changed from a state where the slider is in contact with the recording medium to a state where the slider is allowed to float on the recording medium; and a thin-film device disposed at an end of a trailing portion of the slider, wherein thin films are partially formed on air bearing surfaces of the slider that is brought into contact with the recording medium when the operation of the recording medium is stopped.

In the present invention, the foregoing thin films are formed into projections projecting over the air bearing surfaces of the slider. Although the thin-film (device is a magnetic detection portion (an MR device portion) using a magnetoresistive effect or a thin-film device having a magnetic recording inductive device portion, the present invention can be applied to a conventional magnetic head of a type in which a core, around which a coil is wound, is disposed at an end of a trailing portion of the slider.

It is preferable that the foregoing structure be arranged such that the difference in the height between the surfaces of the air bearing surfaces and the surfaces of the thin films is 10 nm or more, more preferably 15 nm or more, and most preferably 17 nm or more or 18 nm or more.

It is preferable that the ratio of the surface area of the thin films with respect to the overall area of the air bearing surfaces be 80% or less, more preferably 75% or less, 70% or less, 60% or less or 50% or less.

In a case where the magnetic detection portion is a thin-film device and as well as the protective films for covering the air bearing surfaces and the thin-film device are formed, partial thin films made of same material as that of the protective films may be formed on the surfaces of the protective films.

The foregoing structure has the arrangement such that the thin films each having a predetermined area with respect to the areas of the air bearing surfaces are formed on the surface of the slider on which it is brought into contact with the recording medium. When the operation of the recording medium is stopped, the surfaces of the thin films are brought into contact with the recording medium. The area of contact between the recording medium and the slider is the same as the area of the thin film so that the area of contact between the recording medium and the slider is reduced. Because of the reduction in the area of contact, the static friction coefficient between the recording medium and the slider is decreased. The thin films made of hard material having a small friction coefficient, such as hydrogenated carbon (C—H), is able to further decrease the static friction coefficient and prevent abrasion of the contact surface of the slider taking place due to the sliding operation with respect to the recording medium.

It is preferable that the material of the thin films be a hard material having a small friction coefficient, for example, the foregoing hydrogenated carbon, SiC, $SiO_2$, $SiO_2$, $Si_3N_4$ and $Al_2O_3$.

The thin films can be formed by a relatively simple method comprising the steps of masking the air bearing surfaces of the slider; and performing sputtering or evaporating. Therefore, the area and thickness of the thin film can easily be controlled.

A lubricant and water screen formed depending upon the humidity adhere to the surface of the hard disk serving as the recording medium. In general, in an environment in which the relative humidity is, for example, 50%, the total thickness of the lubricant and the water screen is about less than several nm, that is, less than 10 nm. Therefore, if the height δ of the stepped portion between the surfaces of the air bearing surfaces of the slider and the thin films is less than 10 nm, a liquid film intervenes between the air bearing surfaces and the recording medium. The adsorption force of the liquid film enlarges the static frictional force between the slider and the recording medium, whereby the effect attainable from forming the thin films deteriorates. Therefore, it is preferable that the height δ of the stepped portion between the surfaces of the air bearing surfaces of the slider and the surfaces of the thin films be 10 nm or more. According to carried out experiments, the static frictional force can be made to be less than 6 g if the height δ of the stepped portion is made to be 15 nm or more. By making δ to be 17 nm or more or 18 nm or more, the static frictional force can be made to be 5 g or less. In consideration of the starting torque for the disk serving as the recording medium, it is most preferable that the static frictional force be 5 g or less.

By making the ratio of the surface area of the thin films with respect to the overall area of the contact surface of the slider to be 80% or less in a state where the thickness of the thin film is 20 nm or more and the adsorption taking place due to the liquid film is prevented, the static frictional force can be reduced to less than 6 g. By making it to be 75% or less or 70% or less, the static frictional force can be reduced to be 5 g or less. By making it to be 60% or less, the static frictional force can be reduced to be 4 g or less, and by making it to be 50% or less, the static frictional force can be reduced to be 3 g or less.

Thus, to make the static frictional force between the slider and the recording medium to be 5 g or less, it is preferable that the thickness of the thin films be 17 nm or more, 17.5 nm or more or 18 nm or more, as well as the ratio of the area of the thin films with respect to the air bearing surfaces be 75% or less or 70% or less. To make the static frictional force to be 4 g or less, it is preferable that the thickness of the thin films be 20 nm or more and the area ratio be 60% or less. The most preferable structure for reducing the static frictional force is such that the area ratio of the thin films is about 33.3% and the height of the thin films is about 26 nm.

In the case where the thin-film device using, for example, the magnetoresistive effect, as the magnetic detection portion, the exposed portion of the thin-film device is protected by protective films formed to cover the exposed portion and the entire surfaces of the air bearing surfaces. If the protective film is too thick, the space between the exposed portion of the thin-film device and the recording medium becomes too large. Therefore, it is preferable that the thickness of the protective film be a thin thickness of 200 Å or less or 250 Å or less. In the case where the protective films are formed, the thin films made of the same material as that of the protective films are formed on the protective films. By forming the protective films and the thin films with the same material, the protective films and the thin films can be continuously formed by sputtering or evaporating using the same target.

Other and further objects, features and advantages of the invention will be appear more fully from the following description.

BRIEF DESCRIPTION OF THE DRAWINGS

FIGS. 3A and 3B show a magnetic head according to a second embodiment of the present invention, in which FIG. 3A is a side elevational view, and FIG. 3B is a plan view;

FIGS. 4A and 4B show a magnetic head according to a third embodiment of the present invention, in which FIG. 4A is a side elevational view, and FIG. 4B is a plan view;

FIGS. 5A and 5B show a magnetic head according to a fourth embodiment of the present invention, in which FIG. 5A is a side elevational view, and FIG. 5B is a plan view;

DESCRIPTION OF THE PREFERRED EMBODIMENTS

Preferred embodiments of the present invention will now be described with reference to the drawings.

Figure 1:
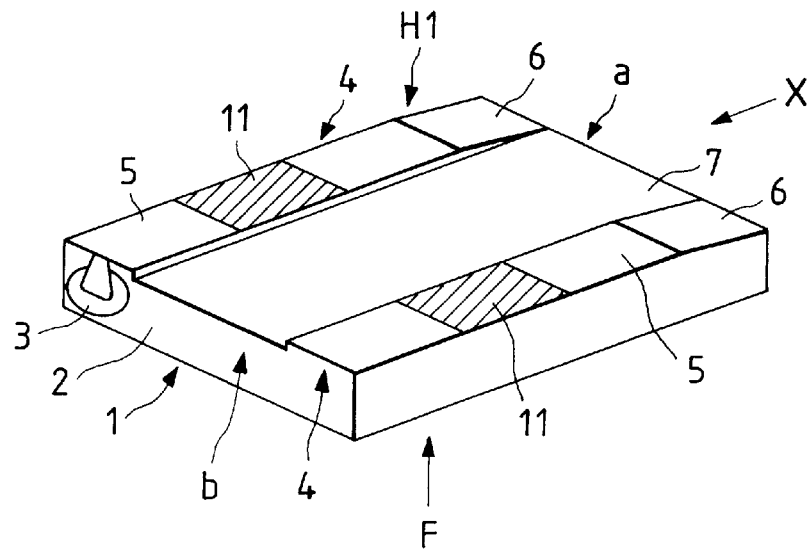
FIG. 1 is a perspective view showing a floating type magnetic head according to a first embodiment of the present invention in such a manner that the surface of the same confronting the disk is caused to face upwards.
Figure 2A:
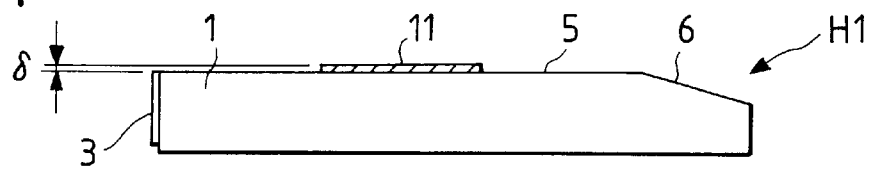
FIG. 2A is a side elevational view showing the magnetic head according to the first embodiment.
Figure 2B:
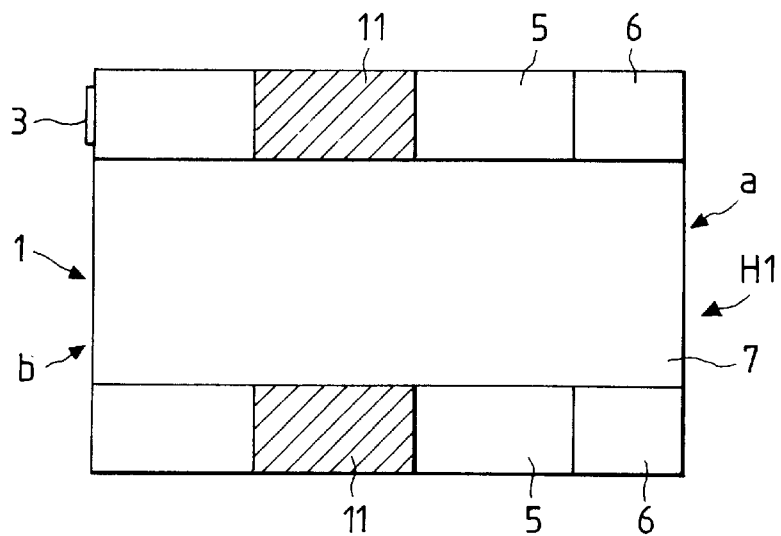
FIG. 2B is a plan view of the same.

FIG. 1 is a perspective view showing a floating type magnetic head according to a first embodiment of the present invention in such a manner that its surface confronting the disk faces upwards. FIG. 2A is a side elevational view, and FIG. 2B is a plan view of the foregoing floating type magnetic head.

A slider 1 of the floating type magnetic head H1 shown in FIGS. 1 and 2 is made of a ceramic material, such as alumina titanium carbide ($Al_2O_3$—TiC), the slider 1 having an air groove 7 formed on a surface thereof that faces the hard disk, which is a recording medium. Furthermore, rail portions 4 are formed on the two sides of the air groove 7, the rail portions 4 having, on the surfaces thereof, flat air bearing surfaces 5. In the present invention, the air bearing surfaces 5 may be formed into the flat shapes to satisfactorily reduce the static frictional force. The air bearing surfaces 5 may be formed into curved shapes (crown shapes) each having a predetermined curvature radius.

The ends of the leading portion a of the air bearing surfaces 5 are formed into inclined surfaces 6. An end surface 2 of the trailing portion b of the slider 1 has a thin-film device 3 disposed thereto. The thin-film device 3 comprises a magnetic detection portion for reproducing a magnet signal recorded on the disk and/or a magnetic recording portion for recording a magnetic signal on to the disk. The magnetic detection portion comprises, for example, a magnetoresistive effect device (an MR device). The magnetic recording portion comprises an inductive device having pattern-formed coil and core.

In the embodiment shown in FIGS. 1 and 2, flat and rectangular thin films 11 are formed in the central portion of the air bearing surfaces 5 except the inclined surfaces 6, that is, in the substantially central portion between the leading portion a and the trailing portion b. FIG. 2A shows the height of the stepped portion from the surfaces of the air bearing surfaces 5 to those of the thin films 11 being indicated by symbol δ.

It is preferable that the material of the thin films 11 be a hard material having a low friction coefficient. For example, hydrogenated carbon (C—H), SiC, $SiO_2$, $Si_3N_4$ or $Al_2O_3$ is employed to form the thin films 11. The thin films 11 are formed on the air bearing surfaces 5 of the slider 1 through adhesive layers. In a case where the thin films 11 are made of a material of a type that can be easily brought into close contact with the slider 1, the adhesive layer is not required. The material of the slider 1 and that of the thin films 11 are the same in each of the embodiments respectively shown in FIGS. 3 to 5.

The thin films 11 are formed by a method comprising the steps of forming masks on the air bearing surfaces 5; and subjecting portions except the masked portions to sputtering or evaporating. By performing masking accurately, the surface area of each of the thin films 11 can be set precisely. By controlling the time in which sputtering or evaporating is performed, the thickness δ of each of the thin films 11 can be controlled.

Figure 3A:
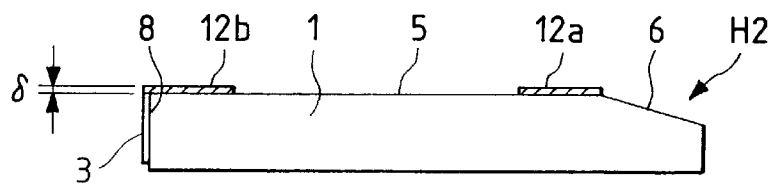
Figure 3B:
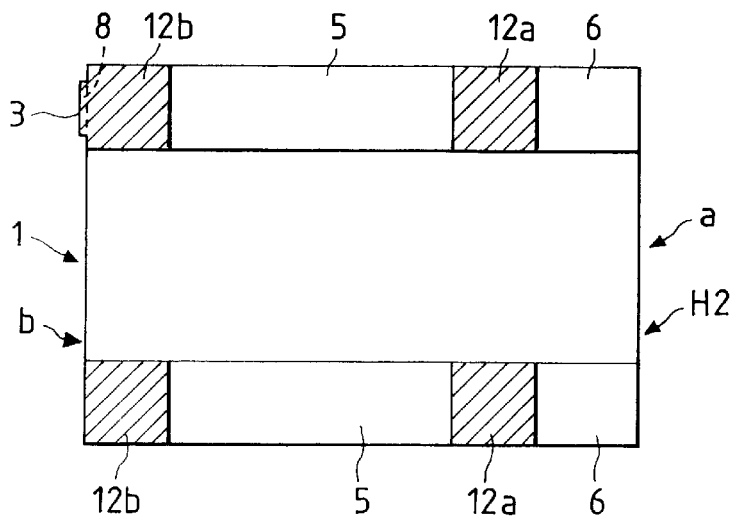

FIG. 3A is a side elevational view of a floating type magnetic head H2 according to a second embodiment of the present invention, and FIG. 3B is a plan view of the same.

The slider 1 and the thin-film device 3 of the magnetic head H2 are the same as those shown in FIG. 1. The magnetic head H2 has thin films 12a each having a predetermined area, the thin films 12a being formed in the portions adjacent to the leading portion a except the portions, in which the inclined surfaces 6 of the air bearing surfaces 5 are formed. Furthermore, thin films 12b are formed in the trailing portion b. The thin films 12a and 12b have the same thickness (the height of the stepped portion) δ.

In this embodiment, the thin film 12b covers an exposed portion 8 of the thin-film device 3 to the air bearing surfaces 5. Thus, the thin film 12b also serves as a protective film for protecting the exposed portion 8 of the thin-film device 3. In a case where the thin-film device 3 mainly comprises an inductive device, it is preferable that the thin films 12a and 12b be made of a non-magnetic material. In a case where the thin-film device 3 includes the magnetoresistive effect device, it is preferable that the thin films 12a and 12b be made of a material that exhibits electrically insulating performance to prevent leakage, to the disk, of the detection electric current supplied to the magnetic reluctance effect device. Forming of a non-magnetic adhesive layer in the case of the inductive device or forming of an adhesive layer capable of electrically insulating the electric current in the case of the magnetoresistive effect device enables the necessity for the material of the thin films 12a and 12b to be the non-magnetic material or the electrically insulating material to be eliminated.

Figure 4A:
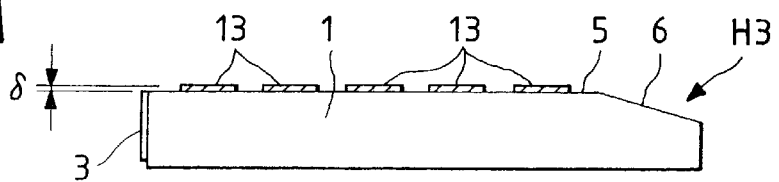
Figure 4B:
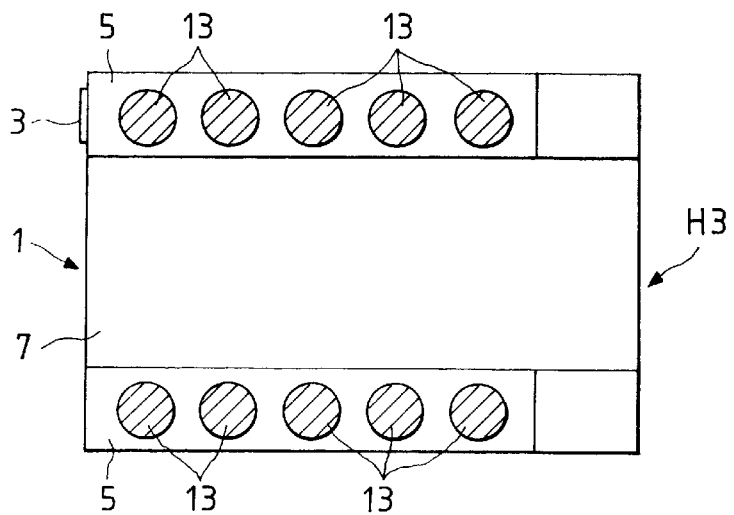

FIG. 4A is a side elevational view showing a floating type magnetic head H3 according to a third embodiment of the present invention, and FIG. 4B is a plan view of the same.

The slider 1 and the thin-film device 3 of the magnetic head H3 are the same as those shown in FIG. 1. In this embodiment, a plurality of thin films 13 are formed on the air bearing surfaces 5. Each of the thin films 13 has a circular outer shape, the thin films 13 being, at predetermined intervals, arranged from the leading portion a to the trailing portion b on the air bearing surfaces 5.

Figure 5A:
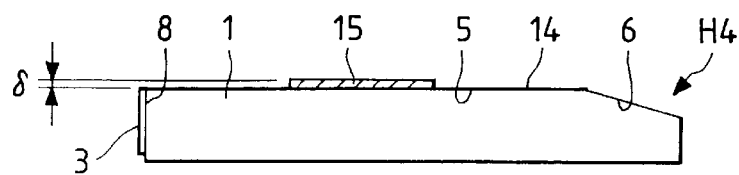
Figure 5B:
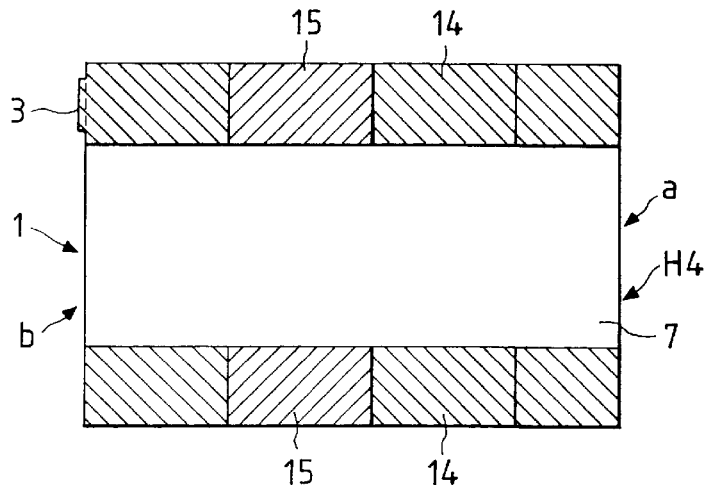

FIG. 5A is a side elevational view showing a floating type magnetic head H4 according to a fourth embodiment of the present invention, and FIG. 5B is a plan view of the same.

In this embodiment, protective films 14 for covering the thin-film device 3 formed in the trailing portion b are formed. The protective films 14 are formed to correspond to the exposed portion 8 of the thin-film device 3 to the air bearing surface 5, the air bearing surfaces 5, and the entire surface of the inclined surfaces 6. Furthermore, thin films 15 are formed on the surfaces of the protective films 14. Similarly to the embodiment shown in FIGS. 1 and 2, the thin films 15 are formed on the air bearing surfaces 5 at the central positions between the leading portion a and the trailing portion b. In the embodiment shown in FIG. 5, the height of the stepped portion from the surface of the protective film 14 to the thin film 15 is δ.

The protective film 14 and the thin film 15 are made of the same material, for example, hydrogenated carbon (C—H), SiC, $SiO_2$, $Si_3N_4$ or $Al_2O_3$ as described above. In the case where the thin-film device 3 is an inductive device, magnetic insulation by means of the protective film is required. In the case where a magnetoresistive effect device is disposed, electrical insulation is required. Therefore, it is preferable that the material of the protective film 14 and the thin film 15 be a non-magnetic material or an electrically insulating material. In a case where an adhesive layer is formed in the base for the protective film, the adhesive layer is required to be the non-magnetic material or the electrically insulating material.

The protective films 14 are thinner than the thickness δ of each of the thin films 15, the thickness being, for example, 250 Å or less, or 200 Å or less. A comparison between the embodiment shown in FIG. 3 and that shown in FIG. 5 results in the common structure in which the thin-film device 3 is protected by the film. In the embodiment shown in FIG. 3, the exposed portion 8 of the thin-film device 3 is covered with the thin film 12b having a relatively large thickness of δ. Thus, there arises a problem in that the space from the exposed portion 8 of the thin-film device 3 to the disk, which is the recording medium, is enlarged excessively. On the other hand, the embodiment shown in FIG. 5 enables the protective films 14 to be made sufficiently thinner than the thin films 15, and therefore the excessive enlargement of the space from the thin-film device 3 to the disk can be prevented, whereby a large output from the head can be obtained.

In the embodiment shown in FIG. 5, the protective films 14 and the thin films 15 are made of the same material. Therefore, the protective films 14 and the thin films 15 can be formed by a continuous process by using the same material as a target in a sputtering process or an evaporating process.

In each of the magnetic heads H1 to H4 shown in FIGS. 1 to 5, the slider 1 is supported by a flexure disposed at the leading portion of a load beam. The slider 1 is urged against a hard disk, which is a recording medium, with a predetermined force F (see FIG. 1), the force F being about 4 g.

The foregoing magnetic head is used in a CSS type hard disk apparatus. When the operation of the disk is stopped, the air bearing surfaces 5 of the slider 1 are brought into contact with the disk through the thin films 11, 12a, 12b, 13 or 15. If the disk has been moved in the direction X shown in FIG. 1, an air flow introduced into the slider 1 and the disk causes the slider 1 to float above the surface of the disk. Although the thin film portion is brought into contact with the disk in each of the magnetic heads H1 to H4, the reduced area of contact and the low friction material forming the thin films reduce the starting torque for starting the operation of the disk.

The results of measured static frictional force of the foregoing magnetic head will now be described.

Experiment 1

Figure 6:
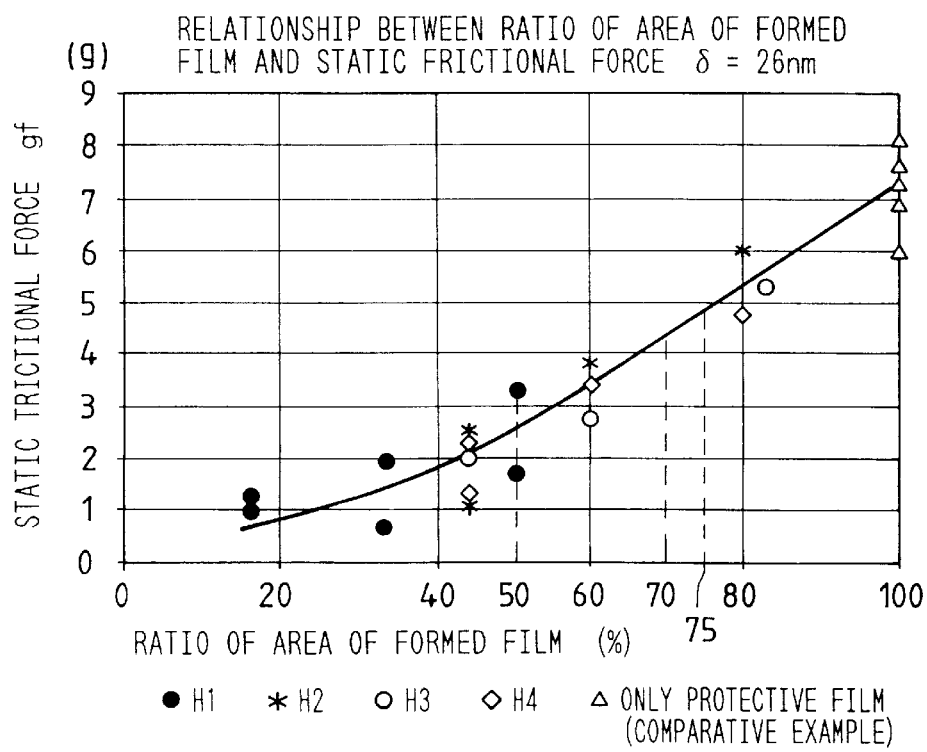
FIG. 6 is a graph showing the relationship between the area ratio of the thin films with respect to air bearing surfaces of a slider and the static frictional force.

FIG. 6 shows the static frictional force attained in the floating type magnetic heads H1 to H4 shown in FIGS. 1 to 5 and measured in such a manner that the area ratio of the surface of the thin film with respect to the overall area of the air bearing surfaces 5 was changed.

In these experiments, the magnetic heads H1, H2, H3 and H4 were made to be examples of the present invention, and a magnetic head based on the structure shown in FIG. 5 except only the protective films 14 being formed but the thin films 15 being not formed was employed as a comparative example.

The thin films 11, 12a, 12b, 13 and 15 and the protective films 14 according to the comparative example for the foregoing magnetic heads were formed by hydrogenated carbon (C—H). In all magnetic heads, the thickness of the thin film, that is, the height δ from the surface of the air bearing surface 5 or the surface of the protective film to the surface of the thin film was made to be 26 nm.

A plurality of samples of the magnetic heads according to the examples and the comparative example were prepared such that the surface area of the thin film was changed with respect to the overall area of the air bearing surfaces 5. Each magnetic head was supported by a flexer secured to the leading portion of a load beam and the thus-supported magnetic head was mounted on a CSS type hard disk apparatus. The slider 1 into contact with the hard disk with force F of 4 g (gram). In this state, the disk was operated, and the static frictional force gf was obtained by dividing the required starting torque by the distance from the center of the disk to the slider.

A hard disk having the surface that was applied with a lubricant having a thickness of about 3 nm was used. The measurement was performed in an environment that the temperature was 20° C. and the relative humidity was 50%.

In FIG. 6, mark • indicates the magnetic head H1 shown in FIGS. 1 and 2, mark * indicates the magnetic head H2 shown in FIG. 3, mark ○ indicates the magnetic head H3 shown in FIG. 4, mark ◇ indicates the magnetic head H4 shown in FIG. 5, and mark Δ indicates the magnetic head according to the comparative example.

According to the results of the measurement shown in FIG. 6, the static frictional force (gf) of the comparative example was very large, whereas the static frictional force (gf) of each example in which the thin films were formed was small. A similar tendency was attained in the results of measurements using the magnetic heads H1 to H4 according to the examples such that the reduction in the ratio of the surface area of the thin films with respect to the overall area of the air bearing surfaces 5 reduces the static frictional force (gf).

Experiment 2

Figure 7:
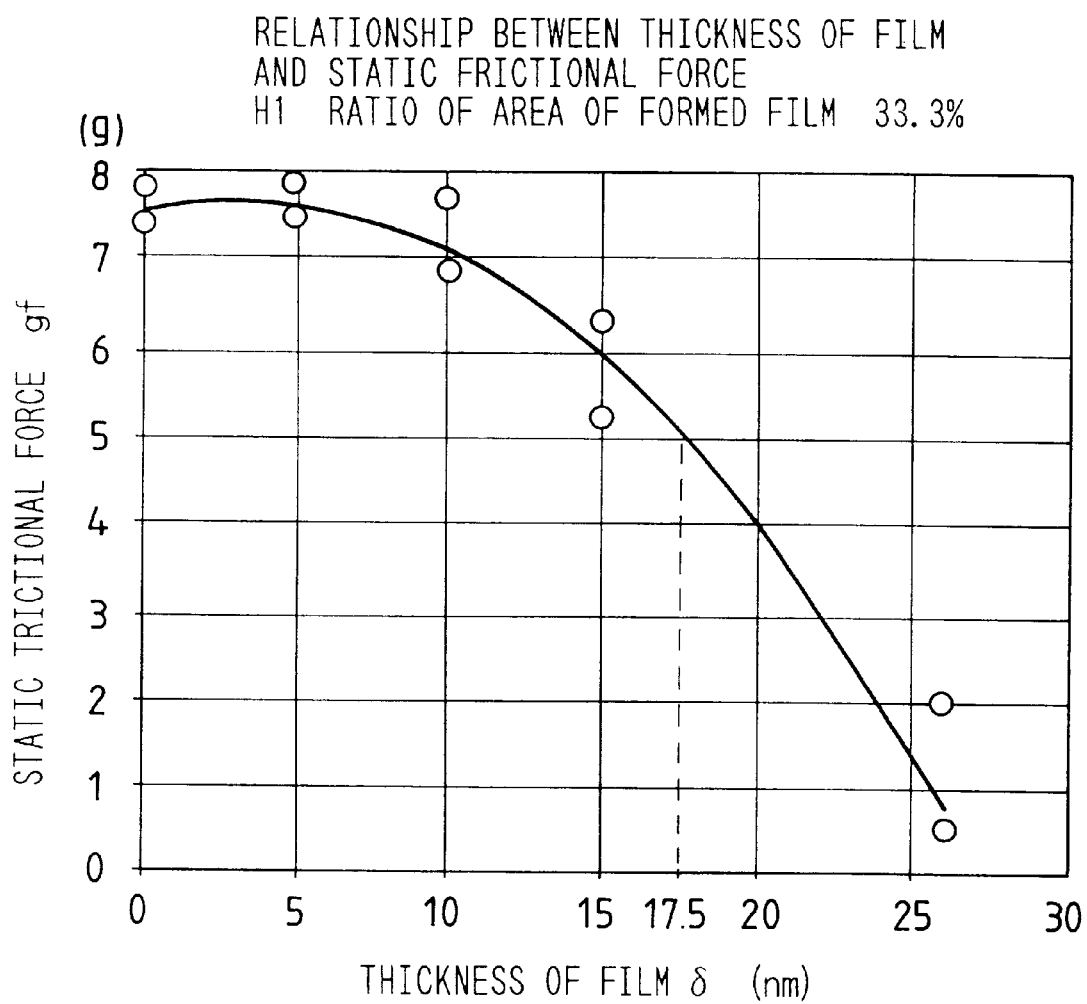
FIG. 7 is a graph showing the relationship between the thickness of the thin film and the static frictional force.
Figure 8:
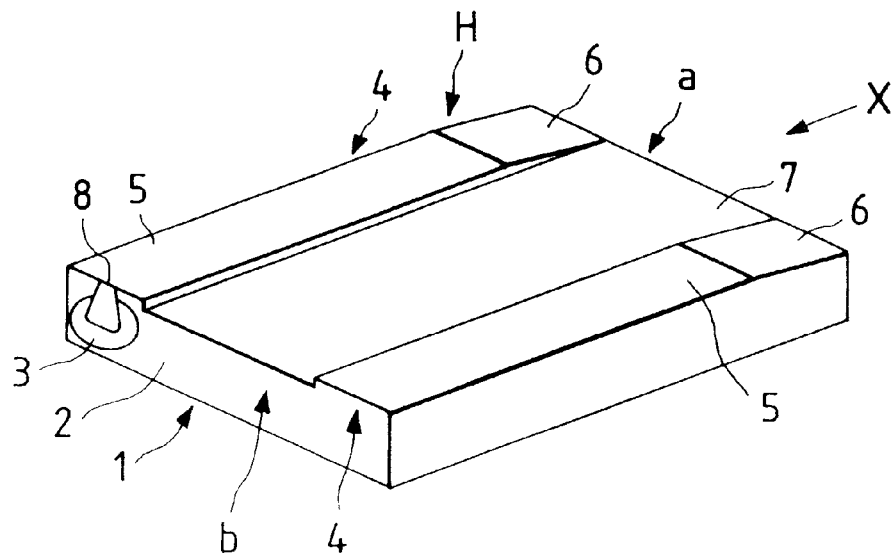
FIG. 8 is a perspective view showing a conventional floating type magnetic head.

FIG. 7 shows results of examination of the relationship between the thickness (the height of the stepped portion) δ of the thin film 11 of the magnetic head H1 according to the first embodiment and the static frictional force (gf) attained from the same.

In the foregoing embodiment, the magnetic head H1 shown in FIGS. 1 and 2 comprised the thin films 11 made of hydrogenated carbon (C—H), and the ratio of the surface area of the thin films 11 with respect to the overall area of the air bearing surfaces 5 was made to be 33.3%. A plurality of samples were prepared in which the height δ of the stepped portion from the thin film 11 to the air bearing surface 5 was changed. The slider 1 of each magnetic head was supported by the flexure at the leading end of the load beam and they were mounted on the CSS type hard disk apparatus, followed by bringing the slider 1 into contact with the disk with force F of 4 g. In this state, the hard disk was operated, and the static frictional force (gf) was obtained similarly to the case shown in FIG. 6. The hard disk was applied with the lubricant to have a thickness of about 3 nm, and the measurements were performed in an environment that the temperature was 20° C. and the relative humidity was 50%.

Figure 9:
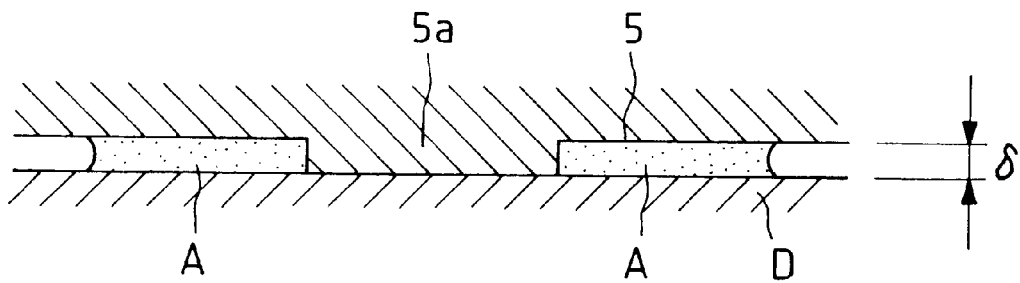
FIG. 9 (Prior Art) is a partially-enlarged cross sectional view showing a state where a liquid film is formed between the slider and the recording medium.

In FIG. 7, the results of measurements of the plurality of the magnetic heads 1 are indicated by marks ○. As shown in FIG. 7, if the thickness δ of the thin film 11 is small, the static frictional force (gf) becomes large, and if the thickness δ is large then the static frictional force (gf) becomes small. In particular, if the thickness δ is 10 nm or larger, the static frictional force is rapidly reduced. The reason for this is that if the thickness of the lubricant applied to the surface of the hard disk is about 3 nm and as well as the relative humidity is 50%, then a liquid film having a thickness of about 10 nm or a thickness less than 10 nm is formed by the water screen and the foregoing lubricant allowed to adhere to the surface of the disk. Therefore, if the thickness δ of the thin film 11 is less than 10 nm as shown in FIG. 9, liquid film A is formed between the air bearing surfaces 5 and the disk, whereby the adsorbing force of the liquid film A enlarges the static frictional force. If the thickness δ is larger than 10 nm, then the liquid film shown in FIG. 9 is not formed between the air bearing surfaces 5 and the disk, whereby the static frictional force due to the adsorbing force is reduced.

The results of the foregoing experiments 1 and 2 results in the following facts to be found.

As can be understood from the results shown in FIG. 7, it is preferable that the height δ of the stepped portion be 10 nm or more to prevent enlargement of the static frictional force. If the height δ of the stepped portion is 15 nm or more, the static frictional force can be made to be less than 6 g. By making δ to be 17 nm or more, 17.5 nm or more or 18 nm or more, the static frictional force can be made to be 5 g or less. If δ is made to be 20 nm or more, the static frictional force can be made to be 4 g or less. In consideration of the starting torque of the disk which is the recording medium, it is preferable that the static frictional force be 5 g or less, and more preferably 4 g or less. Therefore, the preferable range for δ is 17 nm or more or 20 nm or more.

As can be understood from the results shown in FIG. 6, if the thickness δ of the thin film is 26 nm, then the adsorption due to the foregoing liquid film can be prevented. By making the ratio of the surface area of the thin film with respect to the overall area of the air bearing surface of the slider to be 80% or less in the foregoing case, the static frictional force can be made to be less than 6 g. By making it to be 75% or less or 70% or less, the static frictional force can be made to be 5 g or less. By making it to be 60% or less, the static frictional force can be made to be 4 g or less; and by making it to be 50% or less, the static frictional force can be made to be 3 g or less.

To make the static frictional force between the slider and the recording medium to be 5 g or less, it is preferable that the thickness of the thin film be 17 nm, 17.5 nm or 18 nm or more and that the ratio of the area of the thin film with respect to the air bearing surface be 75% or less or 70% or less. To make the static frictional force to be 4 g or less, it is preferable that the thickness of the thin film be 20 nm or more and that the area ratio be 60% or less.

As can be understood from FIGS. 6 and 7, by making the thickness δ to be 25 nm or more and the area ratio of the thin film to be 40% or less, the static frictional force can be made to be 2 g or less. Thus, the starting torque for the CSS type disk can be reduced considerably.

As for the protection of the protective film 3, since the magnetic head H4 shown in FIG. 5 has the protective films 14 formed individually from the thin films 15, enlargement of the space between the thin-film device and the recording medium can be prevented by thinning the protective films 14 to be hundreds of Å even if the thickness of the thin films 15 is made to be, for example, 17 nm or more or 20 nm or more. Therefore, the most preferable magnetic head using the thin-film device 3 is the magnetic head according to the embodiment shown in FIG. 5.

The embodiments shown in FIGS. 1 to 4 are not limited to the foregoing magnetic head having the thin-film device. The embodiments may be employed in a bulk type magnetic head having a structure such that a coil wound around a core is attached to the end surface 2 of the trailing portion.

As described above, according to the present invention, thin films are partially formed on the air bearing surfaces of the slider so that the static friction coefficient between the slider and the recording medium is decreased, whereby the disk starting torque in a CSS type hard disk apparatus or the like can be reduced. Therefore, a small-size motor can be employed to operate the disk, and the electric power consumption can be reduced.

The thin films formed on the air bearing surfaces enable the areas of the same to be precisely set by masking. Furthermore, by controlling the time, in which sputtering or evaporating is performed, the thickness of the thin films can easily be controlled.

By making the height of the stepped portion of the thin film to be a predetermined value or larger, adsorption taking place between the slider and the recording medium due to the liquid film can be prevented, enlargement of the static frictional force due to the adsorption of the liquid film can be prevented, and therefore the effect intended to be obtained by forming the thin films to have a predetermined area can be exhibited satisfactorily.

By making the protective films and the thin films by the same material, the thin-film device can be protected in a case where the thin-film device is employed as the magnetic detection portion. The protective films and the thin films can be formed by a continuous process. If the thin films are thickened to prevent adsorption of the liquid film, the problem of the enlargement of the spacing loss can be prevented by thinning the protective films.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A floating magnetic head for reading information from and writing information to a rotating recording medium, the floating magnetic head comprising:

a slider comprising:
at least two rails separated by an air groove, each of the rails having an air bearing surface facing the recording medium; and
a trailing portion located at an end of at least one of the rails;

wherein an altitude of the slider relative to the recording medium changes in response to a rotational speed of the recording medium from a state where said slider is in contact with said recording medium when the recording medium is stopped to a state where said slider floats over said recording medium when the rotating, speed is equal to a normal operating speed;

a thin-film device disposed on the trailing portion of said slider, and a plurality of nonmagnetic thin films formed on each of the air bearing surfaces of said slider, each of the plurality of nonmagnetic thin films being laterally separated and having a contact surface that is brought into contact with said recording medium when said recording medium is stopped, wherein the slider comes into contact with said recording medium through only said contact surfaces of said plurality of nonmagnetic thin films when said recording medium is stopped, wherein a thickness of each of the plurality of nonmagnetic thin films, measured from each air bearing surface to the contact surface of said plurality of nonmagnetic thin films formed thereon, is in the range from 25 to 100 nm, and wherein the ratio of the portions of said air bearing surface covered by said plurality of nonmagnetic thin films to the total area of said air bearing surfaces is greater than 0% and less than or equal to 40%.

2. A floating magnetic head according to claim 1, wherein the nonmagnetic thin films include at least one material selected from the group consisting of hydrogenated carbon (C—H), SiC, and $Si_3N_4$.

3. A floating magnetic head for reading information from and writing information to a rotating recording medium, the floating magnetic head comprising:

a slider comprising:
at least two rails separated by an air groove;
a trailing portion located at a first end of at least one of the rails; and
a leading portion located at a second end of at least one each of the rails, each of the rails having an air bearing surface facing the recording medium, wherein an altitude of the slider relative to the recording medium changes in response to a rotational speed of the recording medium from a state where said slider is in contact with said recording medium when the recording medium is stopped to a state where said slider floats over said recording medium when the rotating speed is equal to a normal operating speed;

a thin-film device disposed on the trailing portion of said slider, the thin film device having an exposed portion, and protective films formed on an entirety of each of said air bearing surfaces and the exposed portion of the thin film device, said protective films having a first thickness, a plurality of nonmagnetic thin films formed on each of said protective films, other than a portion of the protective films that is formed on the thin film device, wherein said plurality of nonmagnetic thin films comprise one portion formed adjacent the trailing portion, and one portion formed adjacent the leading portion, each of the plurality of nonmagnetic thin films being laterally separated and having a contact surface that is brought into contact with said recording medium when said recording medium is stopped, wherein the slider comes into contact with said recording medium through only said contact surfaces of said plurality of nonmagnetic thin films when said recording medium is stopped, wherein said plurality of nonmagnetic thin films have a second thickness which is greater than the first thickness of the protective films, wherein the plurality of nonmagnetic thin films and said protective films are formed from a common material, wherein the second thickness of said plurality of nonmagnetic thin films is in the range from 25 to 100 nm, and wherein a ratio of the portions of said air bearing surfaces covered by said plurality of nonmagnetic thin films to a total area of said air bearing surfaces is greater than 0% and less than or equal to 40%.

4. A floating magnetic head according to claim 3, wherein the nonmagnetic thin films including at least one material selected from the group consisting of hydrogenated carbon (C—H), SiC, and $Si_3N_4$.

5. A floating magnetic head for reading information from and writing information to a rotating recording medium, the floating magnetic head comprising:

a slider comprising:
at least two rails separated by an air groove, at least one of the rails including a leading portion located at a first end and a trailing portion located at a second end, each of the rails having an air bearing surface extending from the leading portion to the trailing portion which faces the recording medium, wherein an altitude of the slider relative to the recording medium changes in response to a rotational speed of the recording medium from a state where said slider is in contact with said recording medium when the recording medium is stopped to a state where said slider floats over said recording medium when the rotation speed is equal to a normal operating speed; and a thin-film device disposed on the trailing portion of said slider, a plurality of nonmagnetic thin films formed on each of the air bearing surfaces of said slider, the plurality of nonmagnetic thin films include a central region including at least two portions formed between the leading portion and the trailing portion, each of the plurality of nonmagnetic thin films being laterally separated and having a contact surface that is brought into contact with said recording medium when said recording medium is stopped, wherein the slider comes into contact with said recording medium through only said contact surfaces of said plurality of nonmagnetic thin films when said recording medium is stopped, wherein a thickness of each of the plurality of nonmagnetic thin films, measured from each air bearing surface to the contact surface of said nonmagnetic thin film formed thereon is in the range from 25 to 100 nm, and wherein a ratio of the portions of said air bearing surfaces covered by said plurality of nonmagnetic thin films to a total area of said air bearing surfaces is greater than 0% and less than or equal to 40%.

6. A floating magnetic head according to claim 5, wherein said nonmagnetic thin films further comprise a third portion laterally separated from the two portions of thin film, the third portion being formed adjacent the leading portion or the trailing portion of the slider.

7. A floating magnetic head according to claim 5, wherein the nonmagnetic thin films including at least one material selected from the group consisting of hydrogenated carbon (C—H), SiC, and $Si_3N_4$.

8. A floating magnetic head for reading information from and writing information to a rotating recording medium, the floating magnetic head comprising:

a slider comprising:
at least two rails separated by an air groove;
a trailing portion located at a first end of at least one of the rails; and
a leading portion formed at a second end of at least one of the rails, wherein an altitude of the slider relative to the recording medium changes in response to a rotational speed of the recording medium from a state where said slider is in contact with said recording medium when the recording medium is stopped to a state where said slider floats over said recording medium when the rotating speed is equal to a normal operating speed, a thin-film device disposed on the trailing portion of said slider, and a plurality of nonmagnetic thin films formed on each of the air bearing surfaces of said slider, wherein said plurality of nonmagnetic thin films comprise a first portion formed adjacent the trailing portion and a second portion formed adjacent the leading portion, each of the plurality of nonmagnetic thin films being laterally separated and having a contact surface that is brought into contact with said recording medium when said recording medium is stopped, wherein the slider comes into contact with said recording medium through only said contact surfaces of said plurality of nonmagnetic thin films when said recording medium is stopped, wherein a thickness of each of the plurality of nonmagnetic thin films, measured from each air bearing surface to the contact surface of said nonmagnetic thin film formed thereon, is in the range of 25 to 100 nm, and wherein a ratio of the portions of said air bearing surfaces covered by said plurality of nonmagnetic thin films to total area of said air bearing surfaces is greater than 0% and less than or equal to 40%.

9. A floating magnetic head according to claim 3, wherein said nonmagnetic thin films further comprise a third portion laterally separated from the portions of thin film formed adjacent the leading and trailing portions of the slider.

10. A floating magnetic head according to claim 8, wherein said nonmagnetic thin films further comprise a third portion laterally separated from the portions of thin film formed adjacent the leading and trailing portions of the slider.

11. A floating magnetic head according to claim 8, wherein the nonmagnetic thin films including at least one material selected from the group consisting of hydrogenated carbon (C—H), SiC, and $Si_3N_4$.

12. A floating magnetic head for reading information from and writing information to a rotating recording medium, the floating magnetic head comprising:

a slider comprising:
at least two rails separated by an air groove, and a trailing portion located at a first end of at least one of the rails, each of the rails having an air bearing surface facing the recording medium, wherein an altitude of the slider relative to the recording medium changes in response to a rotational speed of the recording medium from a state where said slider is in contact with said recording medium when the recording medium is stopped to a state where said slider floats over said recording medium when the rotating speed is equal to a normal operating speed;

a thin film device disposed on the trailing portion of said slider, the thin film device having an exposed portion;

protective films formed on an entirety of each of said air bearing surface and the exposed portion of the thin film device, said protective films having a first thickness, and a plurality of nonmagnetic thin films formed on each of said protective films other than a portion of the protective films that is formed on the thin film device each of the plurality of nonmagnetic thin films being laterally separated and having a contact surface that is brought into contact with said recording medium when said recording medium is stopped, wherein the slider when said recording medium is stopped comes into contact with said recording medium through only said contact surfaces of said plurality of nonmagnetic thin films, wherein said plurality of nonmagnetic thin films having a second thickness which is greater than the first thickness of the protective films, wherein the plurality of nonmagnetic thin films and said protective films are formed from a common material, wherein the second thickness of said plurality of nonmagnetic thin films is in a range from 25 to 100 nm, and wherein a ratio of the portions of said air bearing surfaces covered by said plurality of nonmagnetic thin films to a total area of said air bearing surfaces is greater than 0% and less than or equal to 40%.

13. A floating magnetic head according to claim 12, wherein the nonmagnetic thin films including at least one material selected from the group consisting of hydrogenated carbon (C—H), SiC, and $Si_3N_4$.

14. A floating magnetic head for reading information from and writing information to a rotating recording medium, the floating magnetic head comprising:
   a slider comprising:
      at least two rails separated by an air groove;
      a leading portion formed at a first end of at least one of the rails; and
      a trailing portion located at a second end of at least one of the rails, each of the rails having an air bearing surface extending from the leading portion to the trailing portion which faces the recording medium, wherein an altitude of the slider relative to the recording medium changes in response to a rotational speed of the recording medium from a state where said slider is in contact with said recording medium when the recording medium is stopped to a state where said slider floats over said recording medium when the rotating speed is equal to a normal operating speed;

a thin film device disposed on the trailing portion of said slider, the thin film device having an exposed portion;

protective films formed on an entirety of each of said air bearing surface and the exposed portion of the thin film device, said protective films having a first thickness, a nonmagnetic thin film formed on each of said protective films other than a portion of the protective films that is formed on the thin film device, wherein said nonmagnetic thin films comprise at least one portion formed between the leading portion and the trailing portion, each of the nonmagnetic thin films having a contact surface that is brought into contact with said recording medium when said recording medium is stopped, wherein the slider when said recording medium is stopped comes into contact with said recording medium through only said contact surfaces of said nonmagnetic thin films, wherein said nonmagnetic thin films having a second thickness which is greater than the first thickness of the protective films, and a first height from one of the air bearing surfaces to the upper surface of one of the protective films is smaller than a second height from one of the air bearing surfaces to the upper surface of one of the nonmagnetic thin films, wherein the nonmagnetic thin films and said protective films are formed from a common material, wherein the second thickness of said nonmagnetic thin films is in a range from 25 to 100 nm, and wherein a ratio of the portions of said air bearing surfaces covered by said nonmagnetic thin films to a total area of said air bearing surfaces is greater than 0% and less than or equal to 40%.

15. A floating magnetic head according to claim 14, wherein said nonmagnetic thin films further comprise a third portion laterally separated from the portion of thin film formed between the leading and trailing portions of the slider.

16. A floating magnetic head according to claim 14, wherein the nonmagnetic thin films including at least one material selected from the group consisting of hydrogenated carbon (C—H), SiC, and $Si_3N_4$.

* * * * *

UNITED STATES PATENT AND TRADEMARK OFFICE
CERTIFICATE OF CORRECTION

PATENT NO.    : 6,172,850 B1
DATED         : January 9, 2001
INVENTOR(S)   : Hirohisa Ishihara It is certified that error appears in the above-identified patent and that said Letters Patent is hereby corrected as shown below:

<u>Title page,</u>
Item [54], change "PATTERN" to -- PATTERNED --.

Item [73], insert -- Tokyo -- before "(JP)".

Item [74], change "Gilsin" to -- Gilson --.

<u>Claim 1,</u>
Line 15, change "rotating, speed" to -- rotating speed --.

Signed and Sealed this

First Day of January, 2002

Attest:

JAMES E. ROGAN
*Director of the United States Patent and Trademark Office*

*Attesting Officer*